US008363910B2

(12) United States Patent
Asukai et al.

(10) Patent No.: US 8,363,910 B2
(45) Date of Patent: Jan. 29, 2013

(54) IMAGE PROCESSING DEVICE, IMAGE PROCESSING METHOD, AND PROGRAM

(75) Inventors: Masamichi Asukai, Kanagawa (JP); Masaaki Tsuruta, Tokyo (JP); Nozomu Ozaki, Kanagawa (JP); Taiji Ito, Kanagawa (JP); Akinobu Sugino, Kanagawa (JP); Hidehiko Sekizawa, Tokyo (JP); Akane Sano, Tokyo (JP); Yoichiro Sako, Tokyo (JP)

(73) Assignee: Sony Corporation, Tokyo (JP)

(*) Notice: Subject to any disclaimer, the term of this patent is extended or adjusted under 35 U.S.C. 154(b) by 1033 days.

(21) Appl. No.: 12/074,667

(22) Filed: Mar. 5, 2008

(65) Prior Publication Data

US 2008/0273798 A1 Nov. 6, 2008

(30) Foreign Application Priority Data

Mar. 8, 2007 (JP) ................................. 2007-058704

(51) Int. Cl.
*G06K 9/00* (2006.01)
(52) U.S. Cl. ........ 382/118; 382/115; 382/190; 382/209; 382/224
(58) Field of Classification Search .................. 382/115, 382/118, 181, 190, 195, 199, 203, 209, 216, 382/217, 224–228
See application file for complete search history.

(56) References Cited

U.S. PATENT DOCUMENTS

| 4,901,096 A | 2/1990 | Lemelson |
| 5,463,443 A | 10/1995 | Tanaka et al. |
| 5,905,848 A | 5/1999 | Yano et al. |
| 5,923,908 A | 7/1999 | Schrock et al. |

(Continued)

FOREIGN PATENT DOCUMENTS

| CN | 1812501 A | 8/2006 |
| JP | 63-053531 A | 3/1988 |

(Continued)

OTHER PUBLICATIONS

Hirasawa et al., "Development of Face Image Capturing System for Best Appearance—The Improvement of the Face Detection Algorithm", Institute of Electronics, Information and Communication Engineers Technical Study Reports, Japan, Corporate Judicial Person Institute of Electronics, Information and Communication Engineers, Nov. 11, 2004, vol. 104, No. 449, p. 61-66.

(Continued)

*Primary Examiner* — Wesley Tucker
(74) *Attorney, Agent, or Firm* — Wolf, Greenfield & Sacks, P.C.

(57) ABSTRACT

There is provided an image processing device that includes a facial image extraction portion, a positivity computation portion, and a selected image update portion. The facial image extraction portion specifies a facial region of an imaged subject within at least one sequentially input selection-eligible image and extracts from the selection-eligible image a facial image that corresponds to the facial region. The positivity computation portion computes for the selection-eligible image, using the corresponding facial image, a positivity of the imaged subject toward a person who acquired the selection-eligible image. The selected image update portion compares the selection-eligible image for which the positivity was computed in the positivity computation portion to a selection candidate image that has the greatest positivity among selection-eligible images for the same imaged subject for which the positivities have already been computed, and makes the image with the greater positivity the new selection candidate image.

17 Claims, 13 Drawing Sheets

U.S. PATENT DOCUMENTS

| | | |
|---|---|---|
| 6,677,969 B1 | 1/2004 | Hongo |
| 7,035,440 B2 * | 4/2006 | Kaku .................. 382/115 |
| 7,596,307 B2 | 9/2009 | Tomita et al. |
| 7,711,253 B2 | 5/2010 | Tomita et al. |
| 2001/0010544 A1 | 8/2001 | Wakui |
| 2004/0130628 A1 | 7/2004 | Stavely |
| 2005/0046730 A1 | 3/2005 | Li |
| 2006/0165396 A1 | 7/2006 | Yamazaki |
| 2006/0171707 A1 | 8/2006 | Higuma |
| 2006/0228029 A1 * | 10/2006 | Zhang et al. ........... 382/232 |
| 2006/0257026 A1 | 11/2006 | Shiffer et al. |
| 2007/0014543 A1 | 1/2007 | Nakase et al. |
| 2007/0076960 A1 * | 4/2007 | Takamori et al. ......... 382/224 |
| 2008/0231714 A1 | 9/2008 | Estevez et al. |
| 2008/0239092 A1 | 10/2008 | Sugino et al. |
| 2008/0316339 A1 | 12/2008 | Sugino et al. |
| 2009/0016645 A1 | 1/2009 | Sako et al. |
| 2010/0066840 A1 | 3/2010 | Asukai et al. |

FOREIGN PATENT DOCUMENTS

| | | |
|---|---|---|
| JP | 03-092830 A | 4/1991 |
| JP | 05-142616 A | 6/1993 |
| JP | 06-030374 A | 2/1994 |
| JP | 07-043803 A | 2/1995 |
| JP | 07-218970 A | 8/1995 |
| JP | 08-110540 A | 4/1996 |
| JP | 10-048681 A | 2/1998 |
| JP | 11-174520 A | 7/1999 |
| JP | 11-205761 A | 7/1999 |
| JP | 2000-132693 | 5/2000 |
| JP | 2000-132693 A | 5/2000 |
| JP | 2001-197296 A | 7/2001 |
| JP | 2002-023716 A | 1/2002 |
| JP | 2002-049912 A | 2/2002 |
| JP | 2003-110999 A | 4/2003 |
| JP | 2004-062560 A | 2/2004 |
| JP | 2004-120404 A | 4/2004 |
| JP | 2004-134950 A | 4/2004 |
| JP | 2004-242360 A | 8/2004 |
| JP | 2005-110004 A | 4/2005 |
| JP | 2005-182526 A | 7/2005 |
| JP | 2005-303511 A | 10/2005 |
| JP | 3740351 B | 11/2005 |
| JP | 2005-352239 A | 12/2005 |
| JP | 2006-050163 A | 2/2006 |
| JP | 2006-197373 A | 7/2006 |
| JP | 2006-201531 A | 8/2006 |
| JP | 2006-202049 A | 8/2006 |
| JP | 2006-202181 A | 8/2006 |
| JP | 2006-203600 A | 8/2006 |
| JP | 2006-221378 A | 8/2006 |
| JP | 2006-279291 A | 10/2006 |
| JP | 2006-319610 A | 11/2006 |
| JP | 2006-330800 A | 12/2006 |
| JP | 2006-331271 A | 12/2006 |
| JP | 2007-166542 A | 6/2007 |
| JP | 2007-249527 A | 9/2007 |

OTHER PUBLICATIONS

Newton, "Philosophiae Naturalis Principia Mathematica" 1687, p. 12-13, vol. 1, Royal Society, London.

* cited by examiner

FIG.5A
SELECTION-ELIGIBLE IMAGE
FIG.5B
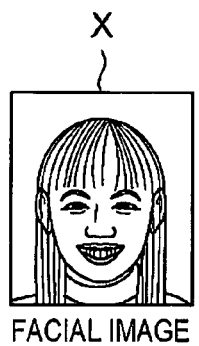
X
FACIAL IMAGE

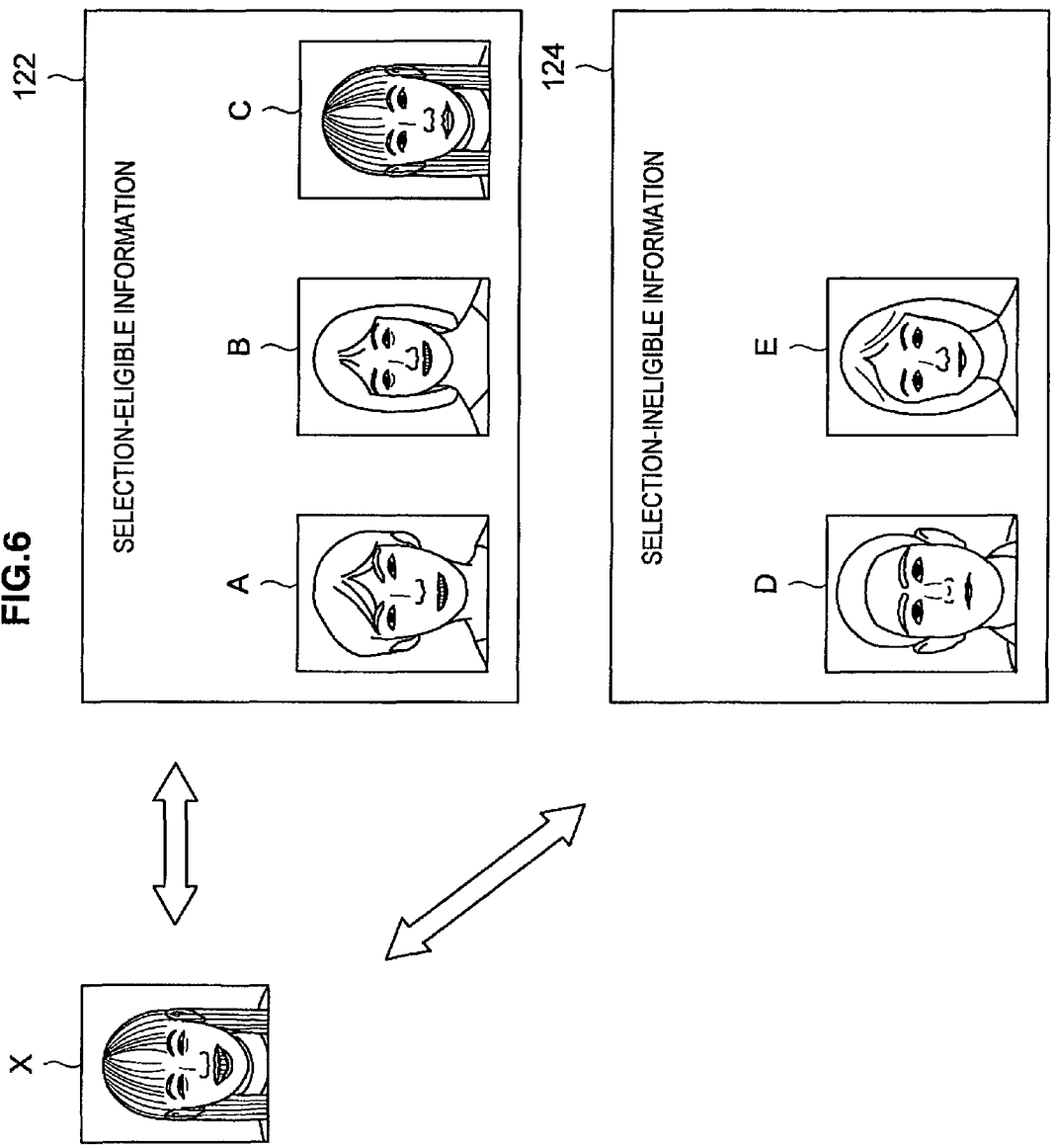

| FACIAL EXPRESSION | | FACE ORIENTATION | | LINE-OF-VISION ORIENTATION | |
|---|---|---|---|---|---|
| SMILING | +10 | FACING FRONT | +5 | STRAIGHT AHEAD | +10 |
| NONE | 0 | FACING SIDEWAYS | 0 | NOT STRAIGHT AHEAD | 0 |
| CRYING | -5 | FACING BACK | -5 | NOT DETECTABLE | -10 |
| ANGRY | -10 | | | | |

POSITIVITY 125
FACIAL IMAGE
(SELECTION-ELIGIBLE IMAGE)

POSITIVITY 0
FACIAL IMAGE
(SELECTION CANDIDATE IMAGE)

POSITIVITY 125
FACIAL IMAGE
(SELECTION CANDIDATE IMAGE)

SELECTION CANDIDATE IMAGE

X
POSITIVITY 125
FACIAL IMAGE
(SELECTION-ELIGIBLE IMAGE)

Xold
POSITIVITY 115
FACIAL IMAGE
(SELECTION CANDIDATE IMAGE)

X
POSITIVITY 125
FACIAL IMAGE
(SELECTION CANDIDATE IMAGE)

Xnew
POSITIVITY 105
FACIAL IMAGE
(SELECTION-ELIGIBLE IMAGE)

X
POSITIVITY 125
FACIAL IMAGE
(SELECTION CANDIDATE IMAGE)

X
POSITIVITY 125
FACIAL IMAGE
(SELECTION CANDIDATE IMAGE)

FIG.11
| NAME | SELECTED IMAGE | POSITIVITY |
|---|---|---|
| 1. MR. A | A  | 140 |
| 2. ---- | X  | 125 |
| 3. MS. B | B 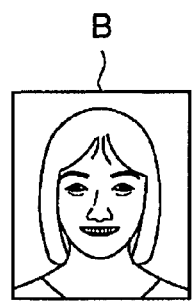 | 120 |
| 4. MR. D | D 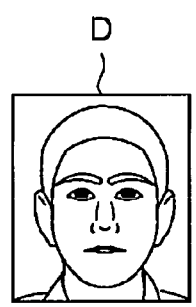 | 85 |
| 5. MS. E | E 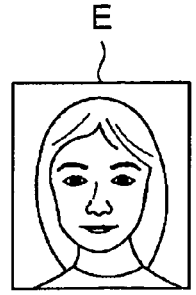 | 80 |

FIG.14
THIS MONTH'S OVERALL RANKING
| | IMAGE | POSITIVITY |
|---|---|---|
| 1 | X 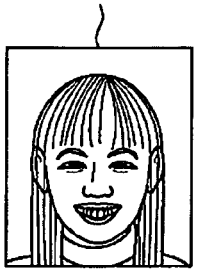 | 134 |
| 2 | A  | 128 |
| 3 | D  | 110 |
| 4 | B 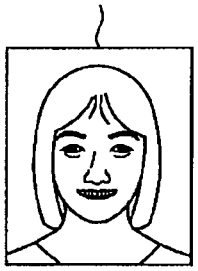 | 109 |
⋮

IMAGE PROCESSING DEVICE, IMAGE PROCESSING METHOD, AND PROGRAM

CROSS REFERENCES TO RELATED APPLICATIONS

The present invention contains subject matter related to Japanese Patent Application JP 2007-058704 filed in the Japan Patent Office on Mar. 8, 2007, the entire contents of which being incorporated herein by reference.

BACKGROUND OF THE INVENTION

1. Field of the Invention

The present invention relates to an image processing device, an image processing method, and a program.

2. Description of the Related Art

In recent years, devices have come in to widespread use that have an image acquisition function for acquiring still images and moving images, or a combination of an image acquisition function and an audio recording function for audio recording and the like. These include digital cameras, digital video cameras such as the Handycam, for which the applicant holds the trademark rights, as well as mobile telephones and the like that have digital camera functions.

By checking the acquired still images and moving images later (for example, that day, several days later, several years later, or the like), users who use these devices can immerse themselves in memories of scenes from the times when the images were acquired. In the process of checking the acquired still images and moving images, the users can discover among the acquired still images and moving images specific images in which a positive feeling toward the person who acquired the image of an imaged subject can be felt, for example, images in which the subject is smiling at the device, images in which the subject's line of vision is directed toward the device, and the like. The users can then obtain those images.

Technology that is concerned with detecting the subject's face has been disclosed in Japanese Patent Application Publication No. JP-A-2000-132693, for example.

SUMMARY OF THE INVENTION

However, as the quantity of the acquired still images and moving images increases, the time required for the users to check the images also increases. Moreover, even if the users take the time to check the images, they cannot always obtain the desired images from the acquired still images and moving images.

The present invention addresses the problem described above to provide an image processing device, an image processing method, and a program that are new and improved and that are capable of selecting an image of each imaged subject from at least one image, based on a relationship between the imaged subject and the person who acquired the image.

According to an embodiment of the present invention, there is provided an image processing device that includes a facial image extraction portion, a positivity computation portion, and a selected image update portion. The facial image extraction portion specifies a facial region of an imaged subject within at least one sequentially input selection-eligible image and extracts from the selection-eligible image a facial image that corresponds to the facial region. The positivity computation portion computes for the selection-eligible image, using the facial image, a positivity of the imaged subject toward a person who acquired the selection-eligible image. The selected image update portion compares the selection-eligible image for which the positivity was computed in the positivity computation portion to a selection candidate image that has the greatest positivity among all the selection-eligible images for the same imaged subject for which the positivities have already been computed, and makes the image with the greater positivity the new selection candidate image.

The image processing device includes the facial image extraction portion, the positivity computation portion, and the selected image update portion. By specifying the region that includes the face portion of the imaged subject within the at least one sequentially input selection-eligible image, the facial image extraction portion can extract the facial image that corresponds to the facial region of the selection-eligible imaged subject. Using the facial image, the positivity computation portion can compute the positivity for the selection-eligible image, the positivity being a value that quantifies the relationship between the imaged subject in the selection-eligible image and the person who acquired the selection-eligible image. The selected image update portion can compare the selection-eligible image for which the positivity was computed in the positivity computation portion to the selection candidate image, which is the image that has the greatest positivity among all the selection-eligible images for the same imaged subject for which the positivities have already been computed. The selected image update portion makes the image with the greater positivity the new selection candidate image. This configuration makes it possible to select, from the at least one selection-eligible image, the image that has the greatest positivity for the imaged subject, based on the positivity of the relationship between the imaged subject and the person who acquired the image.

The image processing device may also include an image selection portion that selects, as a selected image for the imaged subject, the selection candidate image for the imaged subject that was updated in the selected image update portion.

This configuration makes it possible to select, from the at least one selection-eligible image, the image that has the greatest positivity for the imaged subject, based on the positivity of the relationship between the imaged subject and the person who acquired the image.

The image processing device may also compute the positivity based on at least one of a size of the facial image, a facial expression of the imaged subject, a face orientation of the imaged subject, a line-of-vision orientation of the imaged subject, a detection of eyes and a mouth, a color saturation of the facial image, and a spatial frequency of the facial image.

This configuration makes it possible to compute quantitatively the positivity of the relationship between the imaged subject and the person who acquired the image.

A corresponding sound may be input for the sequentially input selection-eligible image, and the image processing device may compute the positivity based also on the intonation of the sound and the volume of the sound.

This configuration makes it possible to compute quantitatively the positivity of the relationship between the imaged subject and the person who acquired the image.

The image processing device may also include an eligibility determination portion that determines, for the sequentially input selection-eligible image, whether or not the imaged subject is eligible for a selected image selection.

This configuration makes it possible to control whether or not an image is selected for the imaged subject.

The eligibility determination portion may also make the eligibility determination using selection-ineligible information that specifies an imaged subject that is not eligible for the selected image selection.

This configuration makes it possible to control whether or not an image is selected for the imaged subject.

The image processing device may also include a first positivity editing portion that can increase and decrease the positivity that the positivity computation portion computed for the selection-eligible image.

This configuration makes it possible for a user to increase and decrease the positivity, so the image selection can be performed more flexibly.

The image processing device may also include a second positivity editing portion that can increase and decrease the positivity that was computed for the selection candidate image for the imaged subject.

This configuration makes it possible for the user to increase and decrease the positivity, so the image selection can be performed more flexibly.

The image processing device may also include an image acquisition portion that acquires an image, and the at least one selection-eligible image may be an image that is acquired and input in real time by the image acquisition portion.

The image processing device may also include a storage portion that stores an image, and the at least one selection-eligible image may be an image that is stored in the storage portion.

The at least one selection-eligible image may be an image that is input from an external device.

These configurations make it possible to select, from the at least one selection-eligible image, the image that has the greatest positivity for the imaged subject, based on the positivity of the relationship between the imaged subject and the person who acquired the image, regardless of the input route for the selection-eligible image.

According to the embodiments of the present invention described above, there is provided an image processing method. The image processing method includes a step of specifying the facial region of the imaged subject within the at least one sequentially input selection-eligible image and extracting from the selection-eligible image the facial image that corresponds to the facial region. The image processing method also includes a step of computing for the selection-eligible image, using the facial image, the positivity of the imaged subject toward the person who acquired the selection-eligible image. The image processing method also includes a step of comparing the selection-eligible image for which the positivity was computed in the computing step to the selection candidate image that has the greatest positivity among all the selection-eligible images for the same imaged subject for which the positivities have already been computed, and making the image with the greater positivity the new selection candidate image.

Using this method makes it possible to select, from the at least one selection-eligible image, the image that has the greatest positivity for the imaged subject, based on the positivity of the relationship between the imaged subject and the person who acquired the image.

The image processing method may also include a step of selecting, as a selected image for the imaged subject, the selection candidate image for the imaged subject that is updated when the image with the greater positivity is made the new selection candidate image.

Using this method makes it possible to select, from the at least one selection-eligible image, the image that has the greatest positivity for the imaged subject, based on the positivity of the relationship between the imaged subject and the person who acquired the image.

According to the embodiments of the present invention described above, there is provided a program that causes a computer to function as an extracting portion, a computing portion, and a comparing-updating portion. The extracting portion specifies the facial region of the imaged subject within the at least one sequentially input selection-eligible image and extracts from the selection-eligible image the facial image that corresponds to the facial region. The computing portion computes for the selection-eligible image, using the facial image, the positivity of the imaged subject toward the person who acquired the selection-eligible image. The comparison-update portion compares the selection-eligible image for which the positivity was computed in the computing portion to a selection candidate image that has the greatest positivity among all the selection-eligible images for the same imaged subject for which the positivities have already been computed, and makes the image with the greater positivity the new selection candidate image.

This program makes it possible to select, from the at least one selection-eligible image, the image that has the greatest positivity for the imaged subject, based on the positivity of the relationship between the imaged subject and the person who acquired the image.

The program may also cause the computer to function as a selection portion that selects, as the selected image for the imaged subject, the selection candidate image for the imaged subject that was updated in the comparing-updating portion that makes the image with the greater positivity the new selection candidate image.

This program makes it possible to select, from the at least one selection-eligible image, the image that has the greatest positivity for the imaged subject, based on the positivity of the relationship between the imaged subject and the person who acquired the image.

According to the embodiments of the present invention described above, it is possible to select an image of the imaged subject from the at least one selection-eligible image, based on the relationship between the imaged subject and the person who acquired the image.

BRIEF DESCRIPTION OF THE DRAWINGS

FIG. 5 is an explanatory figure for explaining an extraction of a facial image according to the embodiments of the present invention;

FIG. 6 is an explanatory figure for explaining a determination of whether or not an imaged subject is eligible for a selection of an image according to the embodiments of the present invention;

FIG. 11 is an explanatory figure that shows an example of a selected image list according to the embodiments of the present invention;

FIG. 14 is an explanatory figure that shows an example of a positivity ranking according to the embodiments of the present invention.

DETAILED DESCRIPTION OF THE PREFERRED EMBODIMENTS

Figure 1:
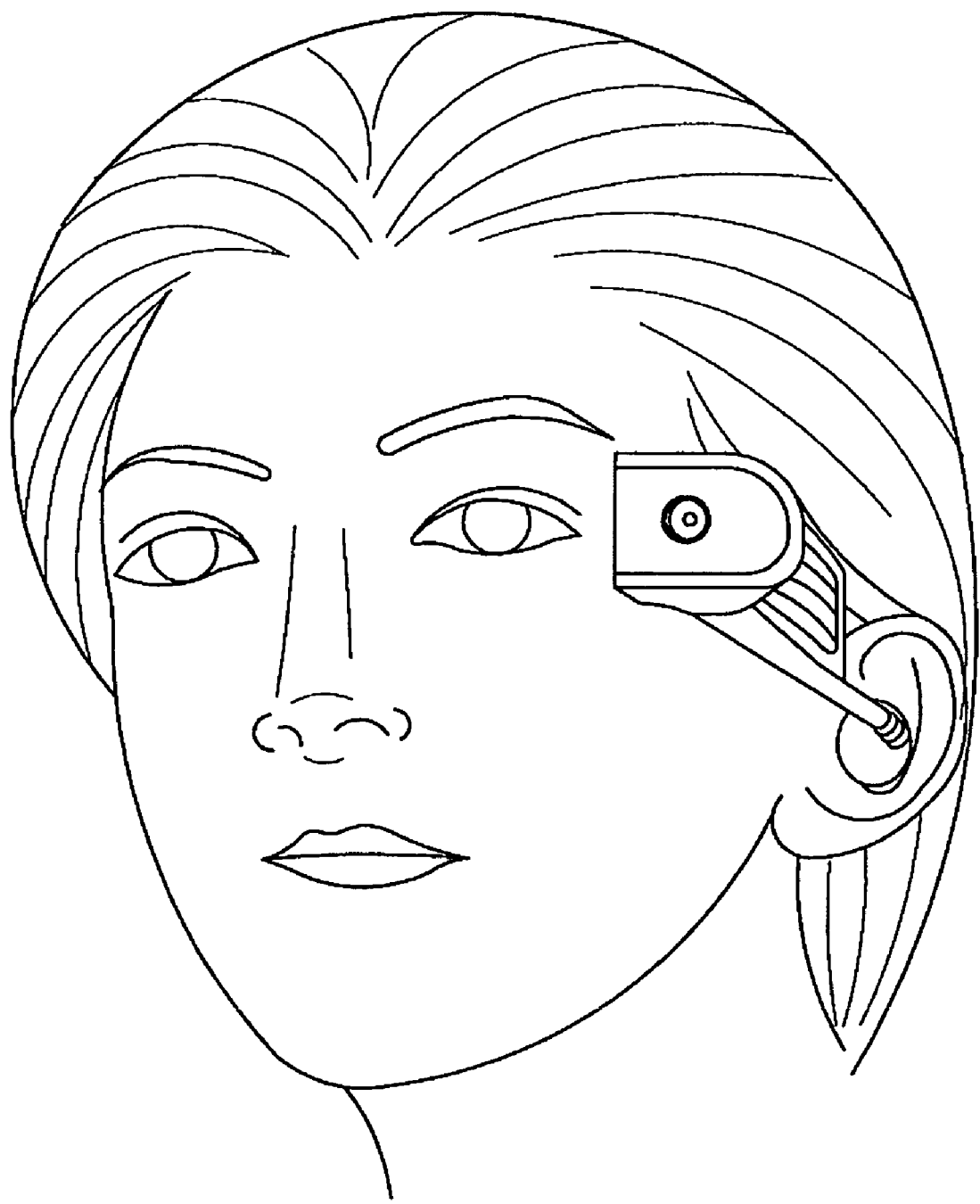
FIG. 1 is an explanatory figure that shows a first example of an image processing device according to embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 2:
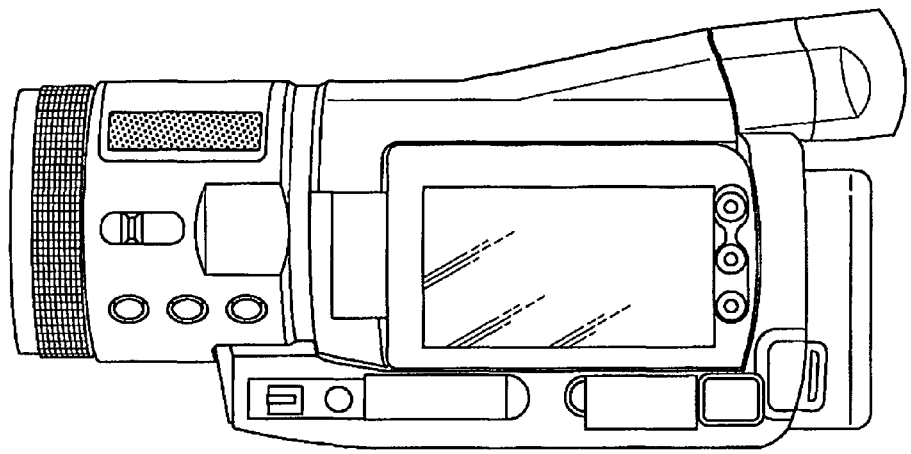
FIG. 2 is an explanatory figure that shows a second example of the image processing device according to the embodiments of the present invention.

Examples of an Image Processing Device According to the Embodiments of the Present Invention First, examples of an image processing device according to the embodiments of the present invention will be shown. FIGS. 1 and 2 are explanatory figures that show the examples of the image processing device according to the embodiments of the present invention.

The image processing device according to the embodiments of the present invention may be a device that has an image acquisition function that is capable of acquiring still images and moving images. For example, the image processing device may be a device that is attached to a user's body, such as a wearable camera or the like, as shown in FIG. 1 (such that images can be acquired from a position that is close to the user's line of vision, for example). The image processing device may also be a digital video camera like that shown in FIG. 2, a digital camera (not shown in the drawings), a mobile telephone with a digital camera function (not shown in the drawings), or the like. The image processing device may also be a device that has an image acquisition function that is capable of recording sound as well as acquiring still images and moving images, and may also be a device that has an audio recording function.

The image processing device according to the embodiments of the present invention is not limited to a device that has an image acquisition function and an audio recording function, like those shown in FIGS. 1 and 2. The image processing device can also be used in an information processing device that may have neither an image acquisition function nor an audio recording function, such as a personal computer (PC), a personal digital assistant (PDA), or the like, for example. The image processing device according to the embodiments of the present invention will be explained below.

First Embodiment

Figure 3:
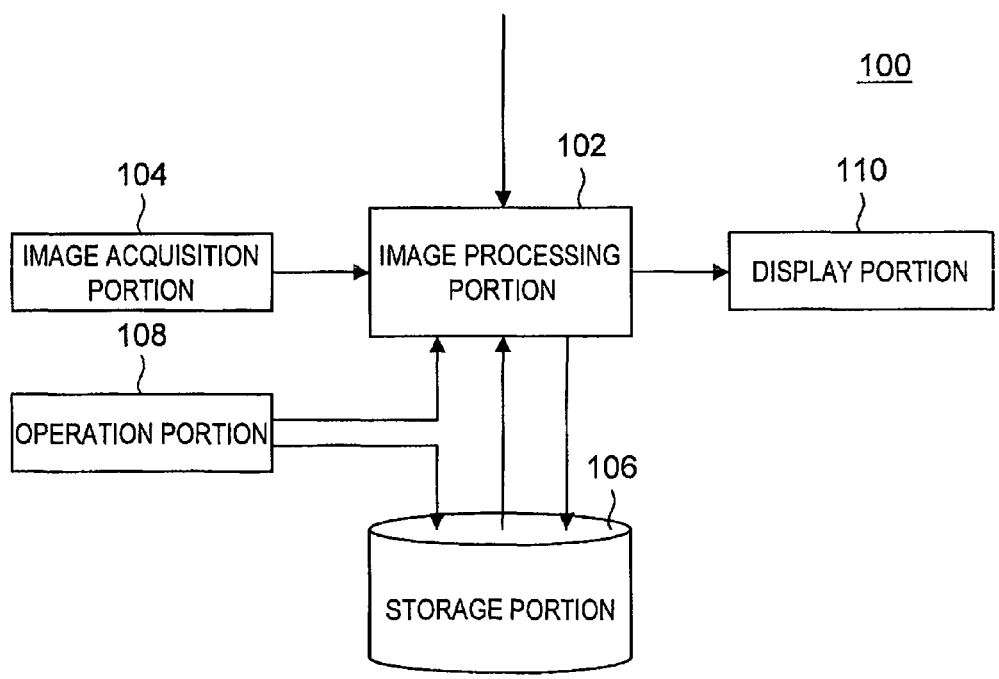
FIG. 3 is a block diagram that shows an image processing device according to a first embodiment of the present invention.

FIG. 3 is a block diagram that shows an image processing device 100 according to a first embodiment of the present invention.

Referring to FIG. 3, the image processing device 100 includes an image processing portion 102, an image acquisition portion 104, a storage portion 106, an operation portion 108, and a display portion 110. The image processing device 100 may also include a control portion (not shown in the drawings) that is configured from a micro-processing unit (MPU) or the like and that controls the entire image processing device 100. The image processing device 100 may also include a communication portion (not shown in the drawings) that can receive images that are transmitted from an external device that is separate from the image processing device 100.

The image processing portion 102 can process an image of an imaged subject from at least one image that is input sequentially to the image processing portion 102 (hereinafter called the "selection-eligible image"), as well as update and select the image. In the present embodiment, the updating and the selection of the image in the image processing portion 102 are performed using a "positivity", which is a value that quantifies a relationship between the imaged subject and the person who acquired the image. The portions that perform the updating and the selection of the image in the image processing portion 102 will be described later.

The selection-eligible image may be an image that is acquired by the image acquisition portion 104 (described below) and may be an image that is stored in the storage portion 106 (described below). The selection-eligible image may also be an image that is transmitted from an external device that is separate from the image processing device 100.

Note that according to the embodiments of the present invention, the selection-eligible image is not limited to being a still image and may also be a moving image (for example, a moving image can be handled frame-by-frame as a set of still images). The still images may be images that are recorded in a still image format, for example, the Joint Photographic Experts Group (JPEG) format, a bitmap, or the like. The moving images may be images that are recorded in a moving image format, for example, Windows Media Video (WMV), the H.264/Moving Picture Experts Group phase-4 Advanced Video Coding (H.264/MPEG-4 AVC) format, or the like. Note that the selection-eligible images according to the embodiments of the present invention are obviously not limited to the examples described above.

The image acquisition portion 104 is an image acquisition portion that has, for example, a lens and an image acquisition element such as a charge coupled device (CCD), a complementary metal oxide semiconductor (CMOS), or the like. The image acquisition portion 104 can create the selection-eligible image by performing image acquisition.

The storage portion 106 is a storage portion that is included in the image processing device 100 and can store at least the selection-eligible image as an acquired image. The storage portion 106 may be, for example, a magnetic storage medium such as a hard disk, a magnetic tape, or the like, a non-volatile memory such as a flash memory, a magnetoresistive random access memory (MRAM), a ferroelectric random access memory (FeRAM), a phase change random access memory (PRAM), or the like, a magneto-optical disk, or the like. The storage portion 106 is obviously not limited to the examples described above.

The operation portion 108 is a device that a user who uses the image processing device 100 can operate. By performing specified operations with the operation portion 108, the user can convey various commands to various portions of the image processing device 100, for example, commands related to the updating and the selection of the image by the image processing portion 102, image acquisition commands to the image acquisition portion 104, and the like. The operation portion 108 may be, for example, a button, a direction key, or a rotary selector such as a jog dial or the like, or any combination of these, but the operation portion 108 is not limited to these examples.

The display portion 110 is a display portion that is included in the image processing device 100 and can display the image that is updated and selected in the image processing portion 102. The display portion 110 may be a liquid crystal display (LCD), an organic light emitting diode display (OLED; also called an organic electroluminescence display), a field emission display (FED), or the like, but the display portion 110 is not limited to these examples.

The image processing device 100 configured as described above can select an image of a given imaged subject from at least one selection-eligible image, based on the positivity that is the value that quantifies the relationship between the imaged subject and the person who acquired the image. An image selection portion according to the embodiments of the present invention will be explained below in order to show in greater detail the updating and the selection of the image in the image processing device 100.

Image Selection Portion According to the Embodiments of the Present Invention

Figure 4:
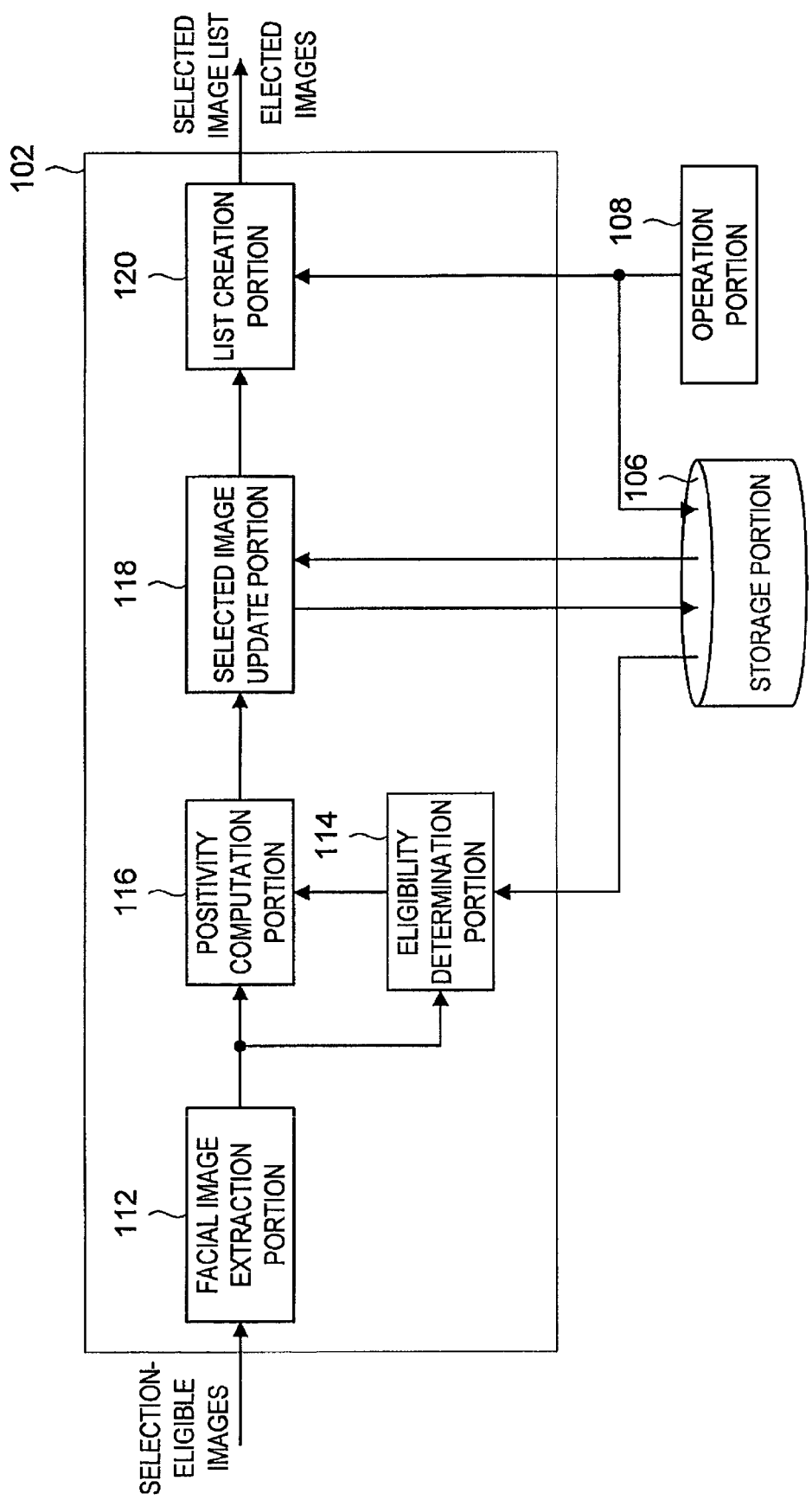
FIG. 4 is a block diagram for explaining an image selection portion according to the embodiments of the present invention.

FIG. 4 is a block diagram for explaining the image selection portion according to the embodiments of the present invention.

Referring to FIG. 4, the image processing portion 102 includes a facial image extraction portion 112, an eligibility determination portion 114, a positivity computation portion 116, a selected image update portion 118, and a list creation portion 120.

The facial image extraction portion 112 specifies a region (hereinafter called the "facial region") within the sequentially input selection-eligible image that contains the face portion of the imaged subject, then extracts (creates) a selection-eligible facial image that corresponds to the facial region of the imaged subject. FIG. 5 is an explanatory figure for explaining the extraction of the facial image according to the embodiments of the present invention. FIG. 5A is a figure that shows an example of a selection-eligible image according to the embodiments of the present invention, and FIG. 5B is a figure that shows that a facial image X is extracted from the selection-eligible image shown in FIG. 5A. Note that the facial image X shown in FIG. 5B does not show the background that is shown in the selection-eligible image shown in FIG. 5A, but the background has been omitted for the sake of convenience and may also be included in the facial image X. (The background is also omitted from the image in the same manner in the drawings shown below.)

The facial image extraction portion 112 specifies, for example, the rectangular facial region within the selection-eligible image that contains the face portion of the imaged subject, as shown in FIG. 5B. The specification of the facial region of the imaged subject can be done, for example, by detecting a region that resembles a brightness distribution and a structural pattern of a face. Note that data related to the specification of the facial region, such as the data for the brightness distribution and the structural pattern of the face, can be stored in the storage portion 106, for example. Alternatively, the image processing device 100 can be provided with the communication portion (not shown in the drawings) such that the data related to the specification of the facial region can be obtained from an external device. However, the method of obtaining the data is not limited to these examples.

Further, in a case where the selection-eligible image is a moving image, the specification of the facial region of the imaged subject can be done, for example, by using a difference between the current frame and the preceding frame to detect a moving body, then specifying a head portion of the detected moving body.

In addition, the size of the rectangular facial region can be determined, for example, by using a table in which the size of the face portion and the size of the rectangular facial region are correlated (the table being stored in the storage portion 106, for example). The size of the rectangular facial region can also be determined by defining the outer boundaries of the facial region to be a set distance from the face portion. The size of the rectangular facial region can also be specified through the operation portion 108 (not shown in FIG. 4).

Once the facial region is specified, the facial image extraction portion 112 extracts the facial image X by, for example, performing a cutting-out (trimming) process that cuts out the facial region. In extracting the facial image X, the facial image extraction portion 112 may also perform a distortion correction process. The distortion correction process according to the embodiments of the present invention may, for example, correct the facial image that was extracted by the cutting-out process in to a rectangular image by expanding, in a horizontal direction and/or a vertical direction, the facial image that was extracted by the cutting-out process, thus equalizing the facial image with respect to the horizontal direction and the vertical direction according to the degree of expansion. Note that the distortion correction process is not limited to this example, and it is obvious that any method can be used that is capable of correcting distortion in the image.

The facial image extraction portion 112 can also append index information, for example, to the extracted facial image, the index information correlating the facial image to the selection-eligible image from which the facial image was extracted. For example, the index information can be appended to the facial image by tagging, digital watermarking, or the like, but the method of appending the index information is not limited to these examples. Appending the index information to the facial image makes it possible to correlate the facial image uniquely to the selection-eligible image from which the facial image was extracted.

The eligibility determination portion 114 can use the facial image that was extracted by the facial image extraction portion 112 to determine whether or not the imaged subject is eligible for image selection. FIG. 6 is an explanatory figure for explaining the determination of whether or not the imaged subject is eligible for image selection according to the embodiments of the present invention.

First Determination Portion for Determining Whether or not the Imaged Subject is Eligible for Image Selection The eligibility determination portion 114 determines whether the facial image X extracted by the facial image extraction portion 112 is eligible for selection by, for example, comparing the facial image X to each of selection-eligible images A to C that are included in selection-eligible information 122 for specifying images that are eligible for selection. In this case, the determination of whether the facial image X is eligible for image selection can be performed by, for example, a face recognition process or the like in which data on feature points is extracted from the facial image and compared to feature point data from the pre-registered selection-eligible images A to C. However, the determination method is not limited to this example.

In FIG. 6, the imaged subject shown in the facial image X is included in the selection-eligible information 122 as the selection-eligible image C, so the eligibility determination portion 114 can determine that the imaged subject shown in the facial image X is selection-eligible. In this case, a determination result as to whether or not the imaged subject is eligible for image selection can be expressed by one bit of data (that is, the determination result is expressed by a value of "0" or "1"), for example, but the determination result is not limited to one bit.

Second Determination Portion for Determining Whether or not the Imaged Subject is Eligible for Image Selection The eligibility determination portion 114 determines whether the facial image X extracted by the facial image extraction portion 112 is eligible for selection by, for example, comparing the facial image X to each of selection-ineligible images D and E that are included in selection-ineligible information 124 for specifying images that are not eligible for selection. In this case, the determination of whether the facial image X is eligible for image selection can be performed by using face recognition technology, for example, in the same manner as in the first determination portion described above.

In FIG. 6, the imaged subject shown in the facial image X is not included in the selection-ineligible information 124, so the eligibility determination portion 114 can determine that the imaged subject shown in the facial image X is selection-eligible. In this case, the determination result as to whether or not the imaged subject is eligible for image selection can be expressed by one bit of data, for example, in the same manner as in the first determination portion described above.

Third Determination Portion for Determining Whether or not the Imaged Subject is Eligible for Image Selection The eligibility determination portion 114 can also determine whether the facial image X extracted by the facial image extraction portion 112 is eligible for selection by using the selection-eligible information 122 for specifying images that are eligible for selection and the selection-ineligible information 124 for specifying images that are not eligible for selection.

In this case, it is possible, for example, for the four patterns shown below to occur.

(1) The imaged subject shown in the facial image X is included in the selection-eligible information 122 and is not included in the selection-ineligible information 124: The same pattern as in the first determination portion.

(2) The imaged subject shown in the facial image X is not included in the selection-eligible information 122 and is included in the selection-ineligible information 124: The same pattern as in the second determination portion.

(3) The imaged subject shown in the facial image X is included in the selection-eligible information 122 and is included in the selection-ineligible information 124.

(4) The imaged subject shown in the facial image X is not included in the selection-eligible information 122 and is not included in the selection-ineligible information 124.

Therefore, in the cases of patterns (3) and (4), it is possible for the third determination portion to change the determination of whether or not the imaged subject shown in the facial image X is eligible for image selection depending on how the determination result is set. A more flexible determination can thus be made.

The eligibility determination portion 114 can determine whether the facial image X is eligible for image selection by using the selection-eligible information 122 and/or the selection-ineligible information 124, as shown in the first to third determination portions, for example. In this case, the information that is set in the selection-eligible information 122 and the selection-ineligible information 124 (for example, the selection-eligible images, the selection-ineligible images, and the like) can be stored in the storage portion 106, for example. The information that is set in the selection-eligible information 122 and the selection-ineligible information 124 can also be registered by the user using the operation portion 108, for example, and can also be transmitted from an external device. However, the setting of the information that is set in the selection-eligible information 122 and the selection-ineligible information 124 is not limited to these examples.

The positivity computation portion 116 uses the facial image that was extracted by the facial image extraction portion 112 to compute the positivity that is the value that quantifies the relationship between the imaged subject in the selection-eligible image and the person who acquired the selection-eligible image.

Figure 7:
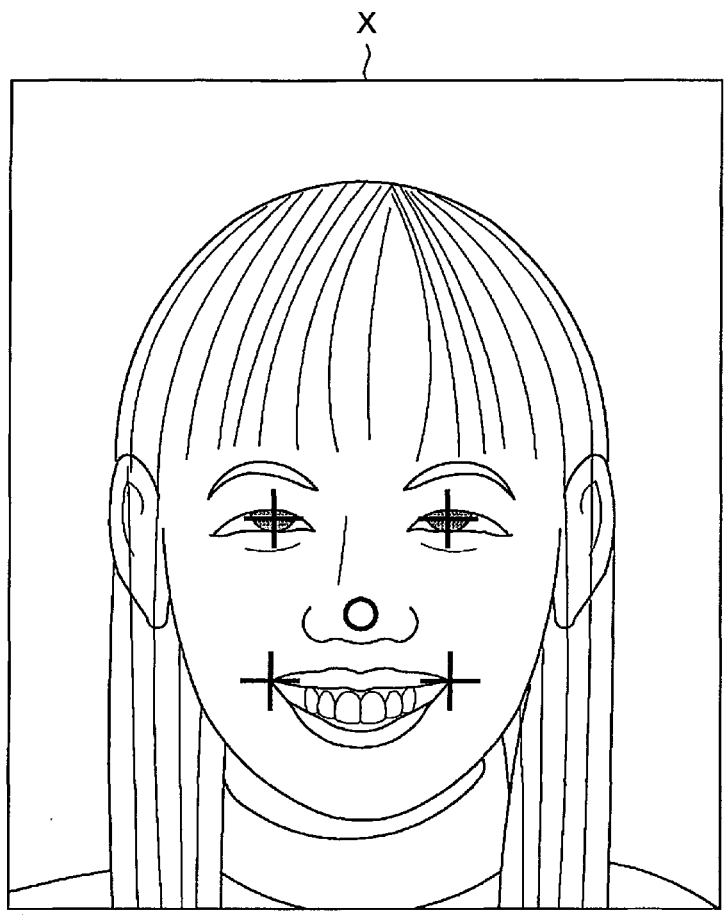
FIG. 7 is an explanatory figure for explaining an example of a positivity computation portion according to the embodiments of the present invention.

The determination result determined in the eligibility determination portion 114, as to whether or not the imaged subject shown in the facial image extracted by the facial image extraction portion 112 is eligible for image selection, is also input to the positivity computation portion 116. The positivity computation portion 116 can be set such that it does not compute the positivity in a case where it is determined in the eligibility determination portion 114 that the imaged subject shown in the facial image is not eligible for image selection. A positivity computation portion according to the embodiments of the present invention will be explained below with reference to FIG. 7. FIG. 7 is an explanatory figure for explaining an example of the positivity computation portion according to the embodiments of the present invention.

First Example of the Positivity Computation Portion

The positivity computation portion 116 can compute the positivity using Equation 1, for example.

Positivity=(Standard value)+(Variable value derived from the facial image)     Equation 1

The standard value in Equation 1 is a value that serves as a standard for the positivity. It may be set to any value, for example, −100, 0, 50.5, 100, 200, or the like. The variable value derived from the facial image in Equation 1 can, for example, be set to a size of the facial image, a facial expression of the imaged subject, a face orientation of the imaged subject, a line-of-vision orientation of the imaged subject, a detection of eyes and a mouth, a color saturation of the facial image, a spatial frequency of the facial image, or the like. However, the variable value derived from the facial image in Equation 1 is not limited to these examples.

FIG. 7 shows, as one example, an example in which the variable value derived from the facial image in Equation 1 is computed using a table that contains values for the three criteria of the facial expression of the imaged subject, the face orientation of the imaged subject, and the line-of-vision orientation of the imaged subject. The positivity computation portion 116 can, for example, detect the positions of the eyes, the nose, and both ends of the lips (the feature points). Based on the detected positions of the eyes, the nose, and both ends of the lips, the positivity computation portion 116 can determine the facial expression, the face orientation, and the line-of-vision orientation of the imaged subject. Note that a determination portion for determining the facial expression, the face orientation, and the line-of-vision orientation according to the embodiments of the present invention is obviously not limited to the example described above.

Furthermore, information for determining the facial expression, the face orientation, the line-of-vision orientation, and the like of the imaged subject (such as information pertaining to the relationship between the facial expression and the detected positions of the eyes, the nose, and both ends of the lips, for example) in the positivity computation portion 116 can be stored in the storage portion 106, for example. The positivity computation portion 116 may also include a storage portion, and the information for determining the facial expression, the face orientation, the line-of-vision orientation, and the like of the imaged subject in the positivity computation portion 116 may also be stored in the storage portion. In this case, the storage portion that is included in the positivity computation portion 116 may be, for example, a magnetic storage medium such as a hard disk or the like, or a non-volatile memory such as a flash memory or the like, but is not limited to these examples.

In the facial image X shown in FIG. 7, the facial expression of the imaged subject is a smiling expression, the face orientation is toward the front, and the line-of-vision orientation is also toward the front. Therefore, in a case where the standard value is 100, the positivity that the positivity computation portion 116 computes for the facial image X is as follows:

Positivity of facial image $X=100+(10+5+10)=125$.

The positivity computation portion 116 can compute the positivity using Equation 1, for example, as shown above. In this case, the positivity is computed using the three criteria of the facial expression, the face orientation, and the line-of-vision orientation of the imaged subject. However, the value derived for the selection-eligible image can set the positivity over a wider range of values if the number of criteria is increased.

Second Example of the Positivity Computation Portion

In the first example of the positivity computation portion, an example was shown in which the positivity is computed using the variable value derived from the facial image, but the positivity computation portion according to the embodiments of the present invention is not limited to the example described above. For example, in some cases, sound will be recorded that corresponds to the selection-eligible image that is input, such as when the selection-eligible image is a moving image acquired by a digital video camera, for example. Therefore, the positivity computation portion 116 can compute the positivity using the sound that corresponds to the selection-eligible image that is input to the image processing device 100. In such a case, the positivity computation portion 116 can compute the positivity using Equation 2, for example.

Positivity=(Standard value)+(Variable value derived from the facial image)+(Variable value derived from the sound)      Equation 2

In Equation 2, the standard value and the variable value derived from the facial image are the same as in Equation 1 above (the first example). The variable value derived from the sound in Equation 2 can be set based on the intonation of the sound, the volume of the sound, or the like, but is not limited to these examples.

The setting of the variable value derived from the sound in the positivity computation portion 116 can be done, for example, by having the positivity computation portion 116 refer to a table in which the intonation of the sound, the volume of the sound, or the like, is uniquely correlated to the variable value. In this case, the information that is used to set the variable value derived from the sound, such as the table described above or the like, can be stored in the storage portion 106, for example. The positivity computation portion 116 may also include a storage portion, and the information that is used to set the variable value derived from the sound may also be stored in the storage portion.

In a case where the sound is used to compute the positivity, the eligibility determination portion 114 can determine whether or not the image is eligible for selection by using sound pattern information that is set in the selection-eligible information 122 and the selection-ineligible information 124. Therefore, even in a case where the sound is used to compute the positivity, the positivity computation portion 116 can be set such that it does not compute the positivity in a case where the eligibility determination portion 114 determines that the imaged subject shown in the facial image is not eligible for selection.

Third Example of the Positivity Computation Portion

In the first example of the positivity computation portion, the variable value derived from the facial image was used to compute the positivity. In the second example of the positivity computation portion, the variable value derived from the sound was used to compute the positivity. However, the positivity computation portion according to the embodiments of the present invention is not limited to these examples. For example, in a case where information is appended to the input selection-eligible image, such as information that indicates the date and time of image acquisition (for example, a time stamp or the like) or information that indicates the location of image acquisition (for example, a latitude, a longitude, or the like), the positivity can be computed by using the information that is appended to the selection-eligible image, as shown in Equation 3. In this case, the information (meta-information) can be appended to the selection-eligible image by tagging, digital watermarking, or the like, for example.

Positivity=(Standard value)+(Variable value derived from the facial image)+(Variable value derived from the sound)+(Variable value derived from the information that is appended to the selection-eligible image)      Equation 3

In Equation 3, the standard value, the variable value derived from the facial image, and the variable value derived from the sound are the same as in Equation 2 above (the second example). The variable value derived from the information that is appended to the selection-eligible image in Equation 3 can be set according to whether or not the information that is appended to the selection-eligible image matches a selection condition, for example, a time, a location, or the like, that the user transmits to the positivity computation portion 116 by using the operation portion 108. Note that in the third example of the positivity computation portion, the information is appended to the selection-eligible image, but the information is obviously not limited to information that indicates the date and time of image acquisition and information that indicates the location of image acquisition.

As described above, the positivity computation portion 116 can use Equations 1 to 3 to compute the positivity. Note that the positivity computation portion according to the embodiments of the present invention is not limited to Equations 1 to 3. The positivity may also be computed based on the variable value derived from the facial image and the variable value derived from the information that is appended to the selection-eligible image.

First Positivity Editing Portion

The user can also increase and decrease the value of the positivity computed by the positivity computation portion 116 by operating the operation portion 108 as a first positivity editing portion (not shown in FIG. 4). In this configuration, the user can adjust the value of the positivity even for a selection-eligible image for which the positivity computation portion 116 computed a low positivity value. The image processing device 100 can thus treat any image that the user desires as a selected image. Note that in this case, it is obvious that the image processing device 100 can have a checking portion (not shown in the drawings) that checks the selection-eligible image for which the positivity computation portion 116 computed the positivity, so that the user can use the operation portion 108 to adjust the positivity value. The checking portion may be a display portion for checking that uses an LCD, an OLED, or the like, but the checking portion is not limited to these examples.

The selected image update portion 118 uses the positivity that the positivity computation portion 116 computed for the facial image to update an image for each imaged subject (hereinafter called the "selection candidate image") that will become a candidate to be the image that is selected for the imaged subject (hereinafter called the "selected image"). In this case, the selection candidate image that the selected image update portion 118 updates can be stored in a storage portion that is provided in the selected image update portion 118, for example, but this example is not limiting, and the selection candidate image may also be stored in the storage portion 106. Note that the storage portion that is provided in the selected image update portion 118 may be, for example, a magnetic storage medium such as a hard disk or the like, or a non-volatile memory such as a flash memory or the like, but is not limited to these examples.

Update portions for the selection candidate image according to the embodiments of the present invention will be explained below with reference to FIGS. 8 to 10.

First Update Portion for the Selection Candidate Image

Figure 8A:
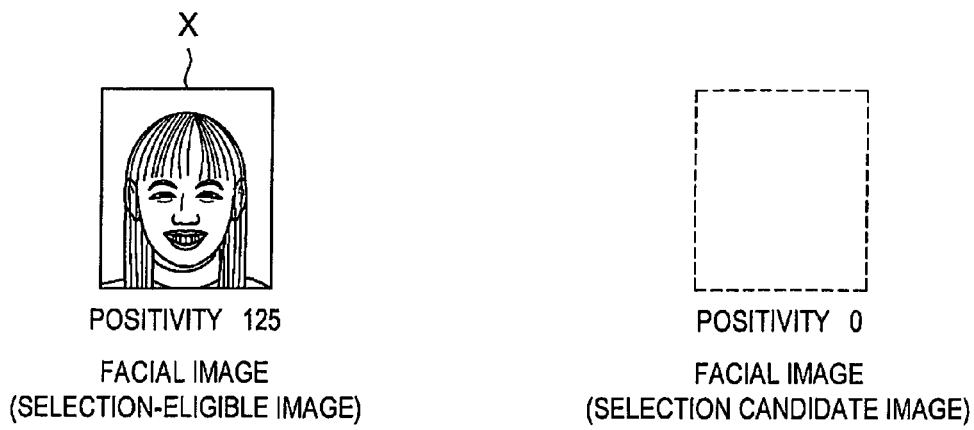
FIG. 8 is an explanatory figure for explaining a first update portion for a selection candidate image according to the embodiments of the present invention.
Figure 8B:
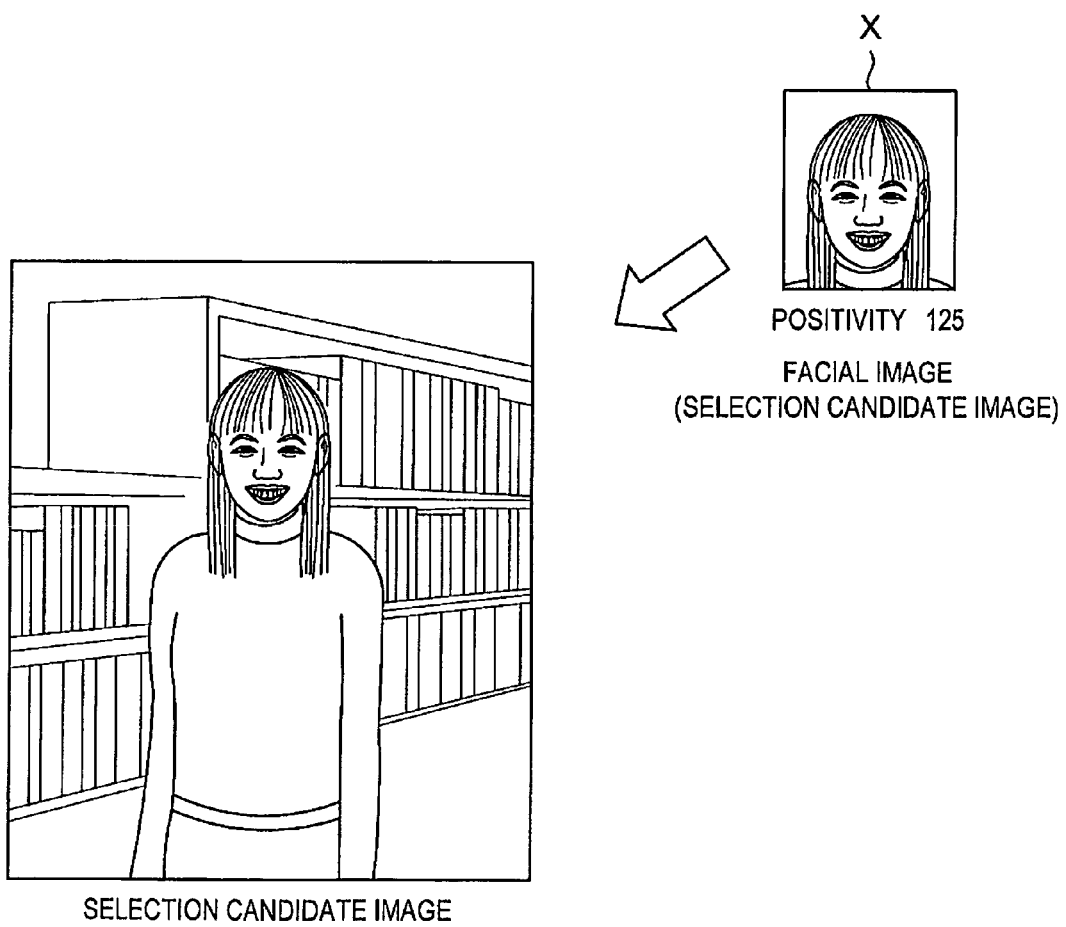

FIG. 8 is an explanatory figure for explaining a first update portion for the selection candidate image according to the embodiments of the present invention. FIG. 8A is a figure that shows a pre-update state, and FIG. 8B is a figure that shows a post-update state.

As shown in FIG. 8A, the first update portion is an update portion that is used in a case where the positivity has not been computed for the imaged subject shown in the facial image X (the selection-eligible image) prior to the extraction of the facial image X, that is, a case where the positivity is computed for the first time for the imaged subject shown in the facial image X.

A determination of whether or not the positivity has already been computed for the imaged subject shown in the facial image X can be made, for example, by performing face recognition that compares the selection candidate image for each imaged subject that the selected image update portion 118 has updated to the facial image X (the selection-eligible image) for which the positivity computation portion 116 has computed the positivity. In a case where the selection candidate image updated by the selected image update portion 118 is stored as the selection-eligible information 122 shown in FIG. 6, the eligibility determination portion 114 determines whether or not the positivity has already been computed for the imaged subject shown in the facial image X. The selected image update portion 118 can then use the result of the determination by the eligibility determination portion 114 to determine whether or not the positivity has already been computed for the imaged subject shown in the facial image X.

In a case where the selected image update portion 118 determines that this is the first time that the positivity has been computed for the imaged subject shown in the facial image X, the selected image update portion 118 performs an update such that the facial image X (the selection-eligible image) becomes the facial image for the new selection candidate image, as shown in FIG. 8B. As described above, the index information that correlates the facial image X to the selection-eligible image from which the facial image X was extracted can be appended to the facial image X. Therefore, by referring to the index information that is appended to the facial image X, the selected image update portion 118 can perform an update such that the selection-eligible image from which the facial image X was extracted becomes the selection candidate image. Note that the selection candidate image that the selected image update portion 118 updates is obviously not limited to the selection-eligible image from which the facial image X was extracted, and the facial image X can also be used for the selection candidate image. In the explanation that follows, the facial image X is used for the selection candidate image for the sake of convenience.

Second Update Portion for the Selection Candidate Image

Figure 9A:
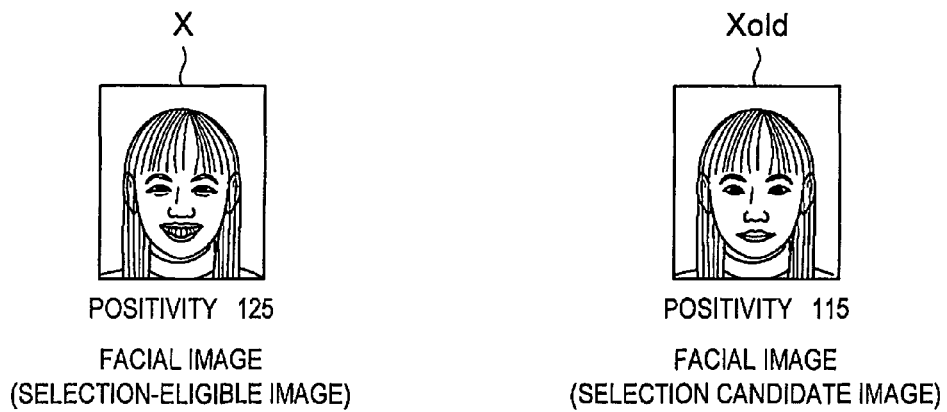
FIG. 9 is an explanatory figure for explaining a second update portion for the selection candidate image according to the embodiments of the present invention.
Figure 9B:
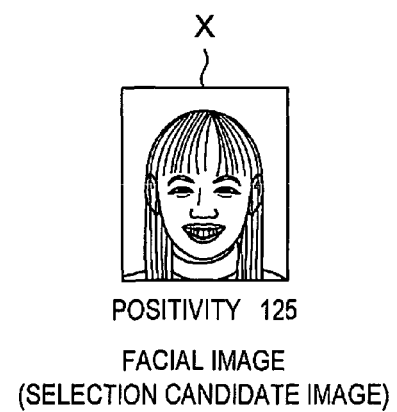

Next, a second update portion will be explained. FIG. 9 is an explanatory figure for explaining the second update portion for the selection candidate image according to the embodiments of the present invention. FIG. 9A is a figure that shows a pre-update state, and FIG. 9B is a figure that shows a post-update state.

As shown in FIG. 9A, the second update portion is an update portion that is used in a case where a facial image Xold (the selection candidate image) exists for which the positivity has already been computed for the imaged subject shown in the facial image X (the selection-eligible image).

In a case where the selected image update portion 118 determines that the positivity has already been computed for the imaged subject shown in the facial image X, the selected image update portion 118 compares the positivity 125 that was computed for the facial image X to the positivity 115 that was set for the selection candidate image (the facial image Xold), for which the positivity has already been computed.

Based on the result of the positivity comparison, the selected image update portion 118 can perform an update such that the image with the greater positivity value becomes the new selection candidate image. Therefore, as shown in FIG. 9B, the selected image update portion 118 performs an update such that the facial image X (the selection-eligible image), for which the positivity value is greater than that for the selection candidate image, becomes the new selection candidate image.

Third Update Portion for the Selection Candidate Image

Figure 10A:
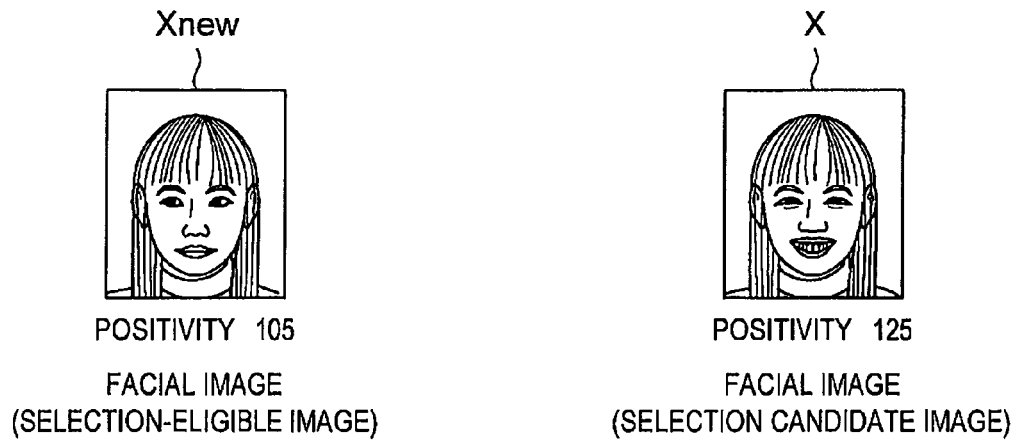
FIG. 10 is an explanatory figure for explaining a third update portion for the selection candidate image according to the embodiments of the present invention.
Figure 10B:
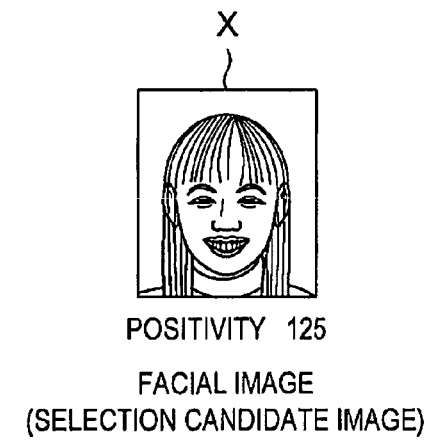

Next, a third update portion will be explained. FIG. 10 is an explanatory figure for explaining the third update portion for the selection candidate image according to the embodiments of the present invention. FIG. 10A is a figure that shows a pre-update state, and FIG. 10B is a figure that shows a post-update state.

As shown in FIG. 10A, the third update portion is an update portion that is used in a case where, when the facial image X has been made the selection candidate image, the positivity is computed for a facial image Xnew (the selection-eligible image) of the same imaged subject as the imaged subject shown in the facial image X.

In a case where the selected image update portion 118 determines that the positivity has already been computed for the imaged subject shown in the facial image Xnew (the selection-eligible image), the selected image update portion 118, in the same manner as in the second update portion, compares the positivity 105 that was computed for the facial image Xnew (the selection-eligible image) to the positivity 125 that was set for the facial image X (the selection candidate image), for which the positivity has already been computed.

As described above, based on the result of the positivity comparison, the selected image update portion 118 can determine that the image with the greater positivity value will serve as the selection candidate image. In a case where the positivity is greater for the selection candidate image (the facial image X) than for the selection-eligible image (the facial image Xnew), as shown in FIG. 10B, the selected image update portion 118 does not perform an update to make the facial image Xnew (the selection-eligible image) the new selection candidate image. Therefore, the facial image X continues to be stored as the selection candidate image.

The selected image update portion 118 performs the processing in the first to third update portions described above each time the positivity is computed by the positivity computation portion 116. Therefore, for every selection-eligible image, the selection candidate image that is stored after the positivity is computed is the image with the greatest positivity for the imaged subject. Note that in a case where the positivity that is computed for the selection-eligible image is the same value as the positivity that is set for the selection candidate image, it is obviously possible for the selected image update portion 118 to perform the update such that the selection-eligible image becomes the new selection candidate image, and for the selected image update portion 118 not to perform the update of the selection candidate image.

Therefore, based on the positivity that is the value that quantifies the relationship between the imaged subject in the selection-eligible image and the person who acquired the selection-eligible image, the image processing portion 102 can select the image with the greatest positivity to be the selected image. In the cases described above, it is possible to prevent more than one image of an imaged subject from being selected as the selected image for the imaged subject.

Note that in the explanation above, a configuration was explained in which the image with the greatest positivity is selected for each imaged subject, but the image processing device 100 according to the embodiments of the present invention is not limited to this example. It is also possible, for example, to select a plurality of the selected images for the same imaged subject. The configuration described above can also be implemented in such a way that the selected image update portion 118 stores a plurality of the selection candidate images for the same imaged subject and then compares the positivity that the positivity computation portion 116 computes for the selection-eligible image to the positivity that is set for each of the plurality of the selection candidate images (that is, performs a one-to-many comparison).

Second Positivity Editing Portion

The user can also increase and decrease the value of the positivity that is set for the selection candidate image updated by the selected image update portion 118 (or, if there is a plurality of the selection candidate images, the positivity that is set for each of the selection candidate images) by operating the operation portion 108 as a second positivity editing portion. (Note that FIG. 4 shows a case in which the selection candidate images are stored in the storage portion 106.) In this configuration, the user can adjust the value of the positivity, so the image processing device 100 can treat any image that the user desires as the selected image. Note that in this case, it is obvious that the image processing device 100 can have a checking portion (not shown in the drawings) that checks the selection candidate image updated by the selected image update portion 118, so that the user can use the operation portion 108 to adjust the positivity value.

The list creation portion 120 is an example of an image selection portion according to the embodiments of the present invention. The list creation portion 120 can use the selected image that the selected image update portion 118 outputs for each imaged subject (the selection candidate image that the selected image update portion 118 updates) to create a selected image list containing all the selected images. FIG. 11 is an explanatory figure that shows an example of the selected image list according to the embodiments of the present invention.

FIG. 11 is an example of a list in which the selected images of the imaged subjects are arranged in descending order by the positivity, based on the positivity that is set for each selected image. Because the list creation portion 120 creates the selected image list as shown in FIG. 11, the user can easily check the selected image that was selected by the image processing device 100 for each imaged subject.

It is also possible for additional information, such as the names of the imaged subjects or the like, to be added to the selected image list that the list creation portion 120 creates, as shown in FIG. 11. In this case, the user can, for example, use the operation portion 108 to edit (add, change, delete, and the like) the additional information, such as the names of the imaged subjects or the like. The additional information may also be added based on information that is appended to the selected image (for example, a tag, a digital watermark, or the like).

Note that it is obvious that the user can, for example, cause the list creation portion 120 to create the selected image list selectively by transmitting commands through the operation portion 108. In a case where the list creation portion 120 does not create the selected image list, the selected image for each imaged subject can, for example, be output individually.

In this manner, the image processing device 100 according to the first embodiment of the present invention extracts the facial image for each imaged subject from the selection-eligible images that are sequentially input to the image processing portion 102 and uses the facial image to compute the positivity for each selection-eligible image. The image processing device 100 can then compare the selection-eligible image for which the positivity has been computed to the selection candidate image, which is the image with the greatest positivity among the selection-eligible images for the same imaged subject for which the positivity has already been computed. The image processing device 100 can then select the image with the greatest positivity to be the new selection candidate image. Therefore, for each imaged subject, the image processing device 100 can select the image with the greatest positivity to be the new selection candidate image.

The positivity that the image processing device 100 uses for selecting images is a quantified indicator that indicates the relationship between the imaged subject in the selection-eligible image and the person who acquired the selection-eligible image. The positivity is computed based on the selection-eligible image. Therefore, the user who uses the image processing device 100 can obtain, for the imaged subject, a specific image in which a positive feeling is felt toward the person who acquired the image of the imaged subject. The image may be an image in which the imaged subject is smiling, an image in which the imaged subject's line of vision is directed toward the image acquisition device, or the like.

Furthermore, because it is possible for the image processing device 100 to select a selected image for each imaged subject, the user can easily check which imaged subjects are included in the selection-eligible images. Therefore, the image processing device 100 can assist the user's recollection of memories. Moreover, because the image processing device 100 selects the selected image for each imaged subject based on the positivity, it is possible for the image processing device 100 to select an image of an imaged subject user did not consider. It is thus possible for the image processing device 100 to act in a positive manner on the user's mental faculties. Therefore, the image processing device 100 can exhibit an effect of helping to maintain the user's mental health.

The image processing device 100 can also be provided with the positivity editing portions that make it possible for the user to edit the positivity. Therefore, the user can make any desired selection-eligible image the image that is selected as the selected image.

The image processing device 100 can also have the selection-eligible information that specifies the imaged subjects for which image selection is permitted and the selection-ineligible information that specifies the imaged subjects for which image selection is not permitted. Therefore, the image processing device 100 can use the selection-eligible information and the selection-ineligible information to control whether or not an image is selected for each imaged subject. The user can also set the selection-eligible information and the selection-ineligible information as desired. Therefore, the user can obtain only an image of a specific imaged subject or can intentionally exclude an image of an undesired imaged subject.

Program According to the First Embodiment

Based on the positivity of the relationship between the imaged subject and the person who acquired the image, a program that causes the image processing device 100 according to the first embodiment to function as a computer can update the selection candidate image for each imaged subject and can select an image for each imaged subject from at least one image.

Image Processing Method According to the Embodiments of the Present Invention

Figure 12:
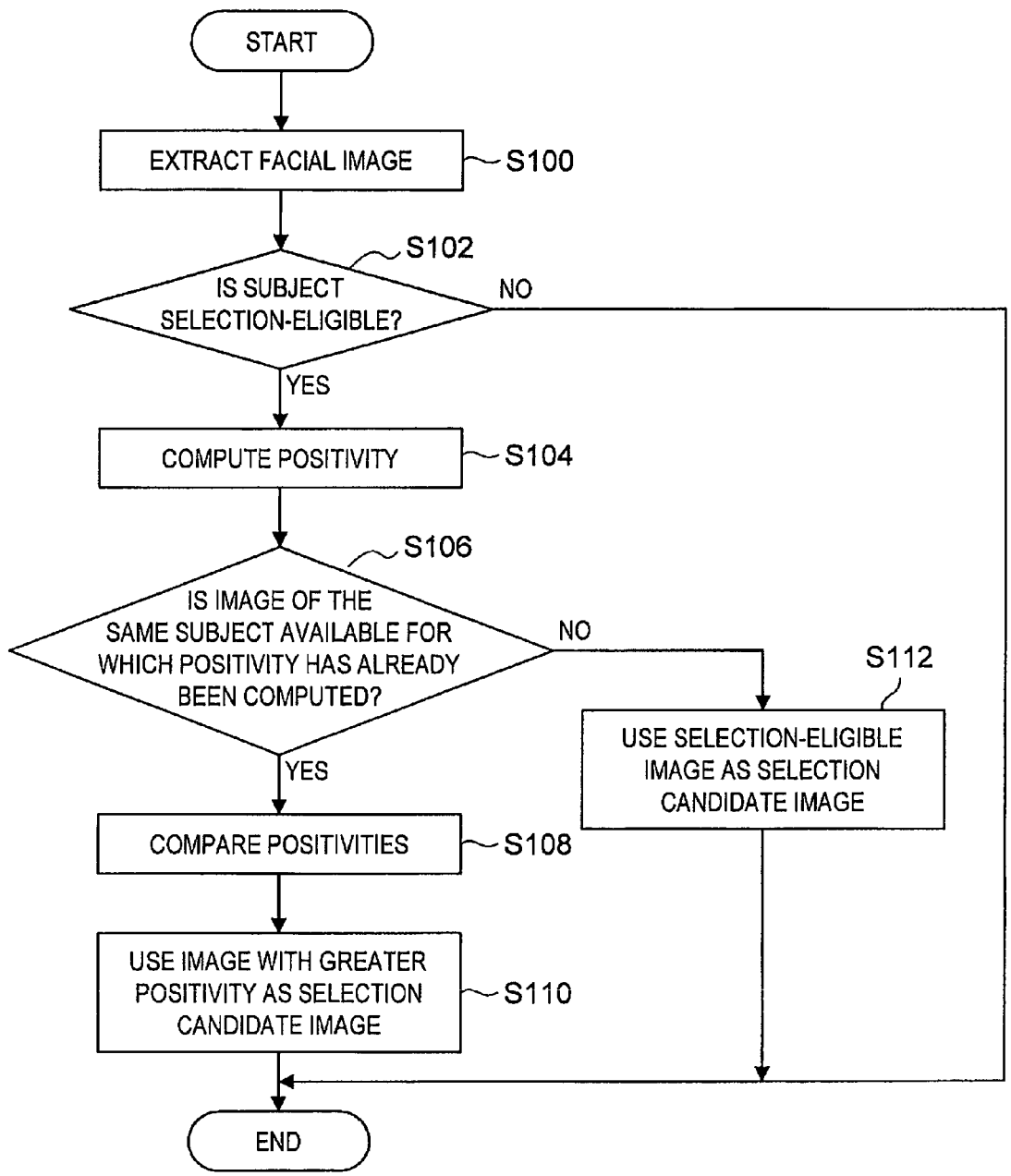
FIG. 12 is a flowchart that shows a flow of an image processing method according to the embodiments of the present invention.

Next, an image processing method according to the embodiments of the present invention will be explained. FIG. 12 is a flowchart that shows a flow of the image processing method according to the embodiments of the present invention. Note that the image processing method shown in FIG. 12 shows one method for image processing and is repeated only for a number of cycles equal to the number of the selection-eligible images that are sequentially input.

The facial region of the imaged subject within one selection-eligible image among the sequentially input selection-eligible images is specified, and the facial image is extracted (Step S100). Next, the facial image extracted at Step S100 is used to determine whether or not the imaged subject shown in the facial image is eligible for image selection (Step S102). In this case, the determination at Step S102 can be performed by, for example, face recognition of the facial image extracted at Step S100, using the selection-eligible information for specifying the images that are eligible for selection and the selection-ineligible information for specifying the images that are not eligible for selection.

If it is determined at Step S102 that the imaged subject shown in the facial image is not eligible for image selection, the processing of the selection-eligible image from which the facial image was extracted at Step S100 terminates.

On the other hand, if it is determined at Step S102 that the imaged subject shown in the facial image is eligible for image selection, the facial image extracted at Step S100 is used to compute the positivity that is the quantified indicator that indicates the relationship between the imaged subject in the selection-eligible image and the person who acquired the selection-eligible image (Step S104).

Next, a determination is made as to whether or not there exists a selection candidate image for which the positivity has already been computed and in which the imaged subject is the same as the imaged subject shown in the facial image for which the positivity was computed at Step S104 (Step S106).

If it is determined at Step S106 that a selection candidate image showing the same imaged subject and for which the positivity has already been computed does not exist, the selection-eligible image from which the facial image was extracted at Step S100 is made the selection candidate image that is the candidate to be the selected image (Step S112).

On the other hand, if it is determined at Step S106 that a selection candidate image showing the same imaged subject and for which the positivity has already been computed does exist, the positivity that was computed at Step S104 (the positivity of the selection-eligible image) and the positivity that is set for the selection candidate image are compared (Step S108). The result of the positivity comparison at Step S108 is then used to make the image with the greater positivity the new selection candidate image (Step S110).

As described above, the image processing method according to the embodiments of the present invention extracts the facial image of the imaged subject from the sequentially input selection-eligible image, then uses the facial image to compute the positivity of the selection-eligible image. The image processing method can then compare the selection-eligible image for which the positivity has been computed to the selection candidate image, which is the image with the greatest positivity among the selection-eligible images for the same imaged subject for which the positivity has already been computed. The image processing method can then select the image with the greater positivity to be the new selection candidate image. Therefore, the image processing device that uses the image processing method according to the embodiments of the present invention can select the image with the greatest positivity as the selected image for each imaged subject.

Further, because the image processing method according to the embodiments of the present invention determines whether or not each imaged subject is selection-eligible, the image processing device that uses the image processing method according to the embodiments of the present invention can control whether or not an image is selected for each imaged subject.

Second Embodiment

The image processing device 100 according to the first embodiment of the present invention was described above as an individual image processing device, that is, as a device that functions in a stand-alone state. However, the image processing device according to the embodiments of the present invention is not limited to the device that functions in a stand-alone state. Accordingly, an image processing device according to a second embodiment of the present invention, which is capable of performing communication with an external device, will be explained next, as will examples of the use of the image processing device according to a second embodiment.

First Use Example

Creation of Positivity Ranking

Figure 13:
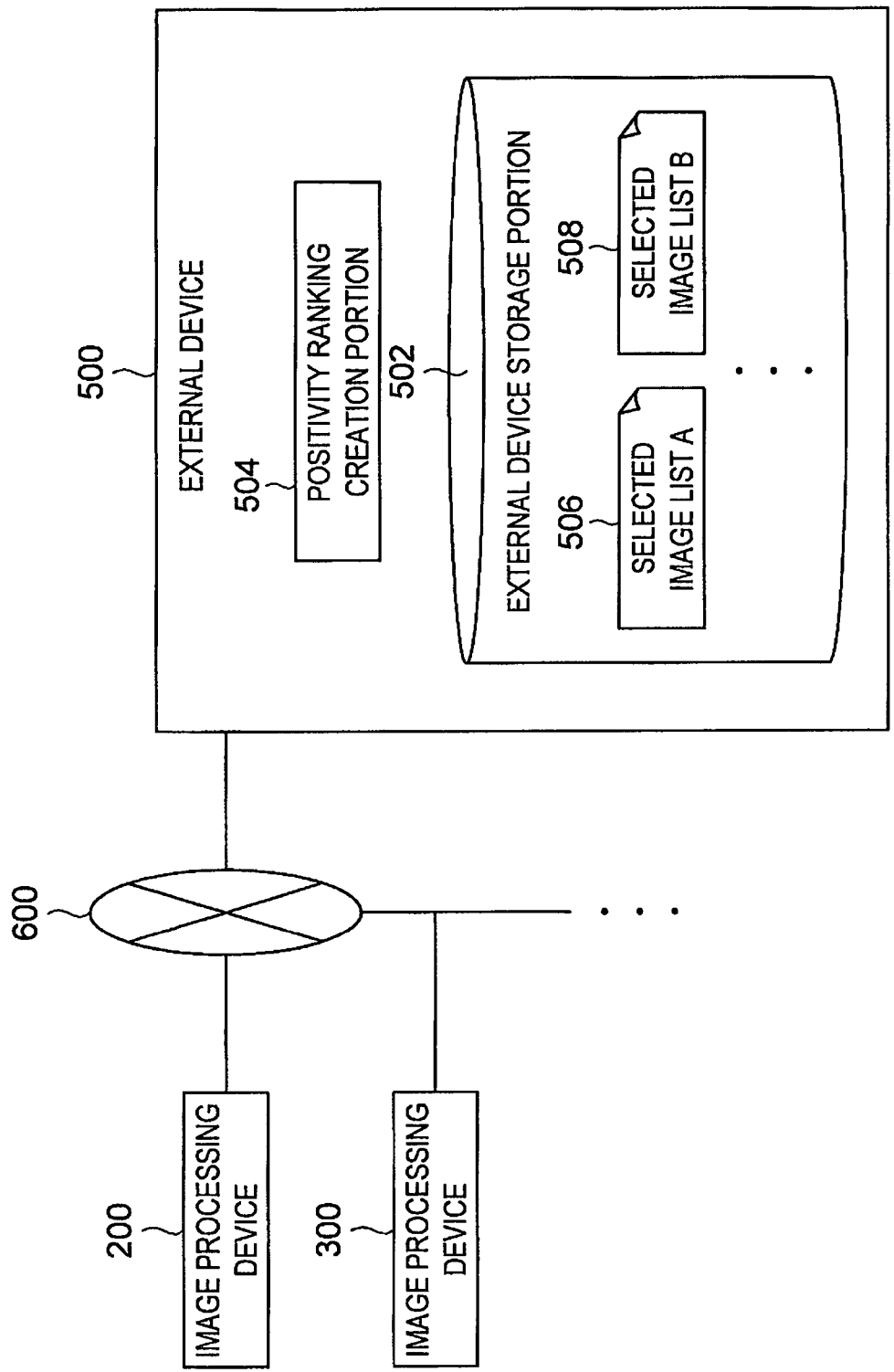
FIG. 13 is a block diagram that shows an example of a system that uses an image processing device according to a second embodiment of the present invention.

FIG. 13 is a block diagram that shows an example of a system that uses the image processing device according to the second embodiment of the present invention.

Referring to FIG. 13, the system that uses the image processing device according to the second embodiment of the present invention includes image processing devices 200, 300, and the like and an external device 500. The image processing devices 200, 300, and the like are connected to the external device 500 through a network circuit 600. The network circuit 600 may be a fixed line network such as a local area network (LAN), a wide area network (WAN), or the like, for example. The network circuit 600 may also be a wireless network, such as a wireless local area network (WLAN) or the like that uses multiple-input multiple-output (MIMO), or the Internet, which uses a communication protocol such as the Transmission Control Protocol/Internet Protocol (TCP/IP) or the like. However, the network circuit 600 is not limited to these examples.

The image processing device 200 is basically configured in the same manner as the image processing device 100 according to the first embodiment of the present invention. Unlike the image processing device 100, the image processing device 200 has an image processing device communication portion (not shown in the drawings) for performing communication with the external device 500 through the network circuit 600. Therefore, the image processing device 200 can select a selected image for each imaged subject in the same manner as the image processing device 100.

The image processing device communication portion (not shown in the drawings) can transmit to the external device 500 the selected image that the image processing portion 102 selects for each imaged subject and the selected image list. Note that the image processing devices 300 and the like are configured in the same manner as the image processing device 200.

The external device 500 can include an external device storage portion 502 and a positivity ranking creation portion 504. The external device 500 may also include a control portion (not shown in the drawings) that is configured from an MPU or the like and that controls the entire external device 500, a communication portion (not shown in the drawings) for communicating with the image processing devices 200, 300, and the like, an operation portion, and the like.

The external device storage portion 502 is a storage portion that is included in the external device 500. As the storage portion that is included in the external device 500, the external device storage portion 502 may be a magnetic storage medium such as a hard disk or the like, a non-volatile memory such as a flash memory or the like, a magneto-optical disk, or the like, but the external device storage portion 502 is not limited to these examples.

The external device storage portion 502 can store the selected images for each imaged subject and the selected image lists that are transmitted from the image processing devices 200, 300, and the like. In FIG. 13, a selected image list A 506 transmitted from the image processing device 200 and a selected image list B 508 transmitted from the image processing device 300 are stored in the external device storage portion 502.

The positivity ranking creation portion 504 uses the selected image lists 506, 508 that are stored in the external device storage portion 502 to tabulate the positivities for the imaged subjects that are included in each of the selected image lists and to create a ranking. Note that it is obvious that the positivity ranking creation portion 504 can also create the ranking by using the selected images that are transmitted from the image processing devices 200, 300, and the like. FIG. 14 is an explanatory figure that shows an example of the positivity ranking according to the embodiments of the present invention.

FIG. 14 is a figure that shows the positivity ranking for a fixed period (one month). The positivities that are shown in the positivity ranking that the positivity ranking creation portion 504 creates can be computed and set in a variety of ways. The positivities can be, for example, the average value for each imaged subject, the total value for each imaged subject, the frequency with which each imaged subject appears in a plurality of the selected image lists, or the like. Further, the image of each imaged subject that is shown in the positivity ranking that the positivity ranking creation portion 504 creates can be, for example, the selected image for which the greatest positivity is set for the imaged subject, but the image of each imaged subject that is shown in the positivity ranking is not limited to this example. Moreover, the positivity ranking that the positivity ranking creation portion 504 creates can be expressed, for example, as an image file in the JPEG format, the Graphics Interchange Format (GIF), or the like, as a Hypertext Markup Language (HTML) document, or the like.

According to the first use example, using the selected images for each imaged subject and the selected lists that are transmitted from the image processing devices 200, 300, and the like to create the positivity ranking like that shown in FIG. 14 makes it possible to implement a view of the imaged subjects such as a page view on the World Wide Web (WWW), for example.

Modified Example of the First Use Example

FIG. 13 shows a configuration that includes a plurality of the image processing devices 200, 300, and the like and the external device 500, but the second embodiment of the present invention is not limited to this configuration. The second embodiment may also be configured to have the one image processing device 200 and the external device 500. If the system that uses the image processing device according to the second embodiment of the present invention is configured in this manner, the positivity ranking creation portion 504 can function as the image selection portion according to the embodiments of the present invention. Therefore, even if the system that uses the image processing device according to the second embodiment of the present invention is configured such that the image processing device 200 does not include a list creation portion (that is, is configured such that the image processing device 200 does not output the selected image list), for example, the selected image list can be created by the positivity ranking creation portion 504.

Second Use Example

Configuration in which the Selected Image for Each Imaged Subject and the Selected Image List are Stored in the External Device The first use example shown in FIG. 13 describes a configuration in which the positivity ranking is created by using the selected images for the imaged subjects and the selected image lists that are transmitted from the image processing devices 200, 300, and the like. However, the system that uses the image processing device according to the second embodiment of the present invention is not limited to this example. For example, the external device may also be configured such that it merely stores the selected images for the imaged subjects and the selected image lists that are transmitted from the image processing devices 200, 300, and the like.

For example, in a case where the person acquiring the images using the image processing device (the user) acquires the images outdoors, the image processing device according to the second embodiment can use the image processing method according to the embodiments of the present invention to perform the selection of the selected images for the images that the image processing device acquires (the selection-eligible images). The image processing device can then transmit the selection results (the selected images for the imaged subjects and the selected image list) to a home PC owned by the person who acquired the images, the home PC being the external device. Therefore, after returning home, the person who acquired the images can easily check which imaged subjects are included in the selection-eligible images just by checking the selection results that are stored in the home PC.

Note that the first and second use examples described above are merely examples of the system that uses the image processing device according to the second embodiment of the present invention, and a system that uses the image processing device according to the embodiments of the present invention is obviously not limited to these examples.

As described above, the image processing device according to the second embodiment of the present invention has basically the same configuration as the image processing device 100 according to the first embodiment of the present invention. Therefore, the image processing device according to the second embodiment of the present invention exhibits the same sort of effect as the image processing device 100 according to the first embodiment of the present invention.

Furthermore, the image processing device according to the second embodiment of the present invention can transmit the selected images for the imaged subjects and the selected image list to the external device. It is therefore possible to implement an application system such as a system that creates the positivity ranking, for example.

The external device has been explained as a configuring element of the system that uses the image processing device according to the second embodiment of the present invention, but the embodiments of the present invention are not limited to this configuration. For example, the present invention can also be applied to a computer such as a PC, a server, or the like.

It should be understood by those skilled in the art that various modifications, combinations, sub-combinations and alterations may occur depending on design requirements and other factors insofar as they are within the scope of the appended claims or the equivalents thereof.

For example, the image processing portion 102 according to the first embodiment of the present invention, shown in FIG. 4, includes the list creation portion 120, but is not limited to this configuration. The image processing portion 102 can also be configured such that it does not include the list creation portion 120. Even in this configuration, the image processing device according to the present invention can update the selection candidate image for the imaged subject based on the positivity of the relationship between the imaged subject and the person who acquired the image. The image processing device according to the present invention can therefore select an image for the imaged subject from at least one image, based on the positivity of the relationship between the imaged subject and the person who acquired the image.

The image processing portion 102 according to the first embodiment of the present invention, shown in FIG. 4, also includes the eligibility determination portion 114, but is not limited to this configuration. The image processing portion 102 can also be configured such that it does not include the eligibility determination portion 114. Even in this configuration, the image processing device according to the present invention can select an image for the imaged subject from at least one image, based on the positivity of the relationship between the imaged subject and the person who acquired the image.

Further, the image processing devices according to the first and second embodiments of the present invention have been explained in terms of a configuration that selects the image based on the positivity, but the image processing devices are not limited to this example. For example, the positivity can be computed using the variable value derived from the sound that is used in Equation 2, such that the input sound can be factored in to the image selection based on that positivity.

The configurations described above are illustrative examples of the embodiments of the present invention and are naturally within the technological scope of the present invention.

What is claimed is:

1. An image processing device comprising:
    a facial image extraction portion configured to specify a facial region of an imaged subject within at least one sequentially input selection-eligible image and to extract from a selection-eligible image in the at least one sequentially input selection-eligible image a facial image that corresponds to the facial region;
    an eligibility determination portion configured to determine whether the imaged subject is eligible for image selection;
    a positivity computation portion configured to compute for the selection-eligible image, using the facial image and information indicating at least one of a date and time of acquisition of the selection-eligible image and a location of the acquisition of the selection-eligible image, a positivity of the imaged subject toward a person who acquired the at least one selection-eligible image if the eligibility determination portion determines that the imaged subject is eligible for image selection; and
    a selected image update portion configured to compare the selection-eligible image for which the positivity was computed in the positivity computation portion to a selection candidate image that has a greatest positivity among all the selection-eligible images for the same imaged subject for which the positivities have already been computed, and to make the image with a greater positivity a new selection candidate image.

2. The image processing device according to claim 1, further comprising:
    an image selection portion configured to select, as a selected image for the imaged subject, the selection candidate image for the imaged subject that was updated in the selected image update portion.

3. The image processing device according to claim 1,
    wherein the positivity is computed based at least in part on a feature selected from the group consisting of a size of the facial image, a color saturation of the facial image, and a spatial frequency of the facial image.

4. The image processing device according to claim 3, wherein
    a corresponding sound is input for the selection-eligible image, and
    the positivity is computed based at least in part on an intonation of the sound and/or a volume of the sound.

5. The image processing device according to claim 1, wherein
    the eligibility determination portion is configured to make the eligibility determination using selection-ineligible information that specifies the imaged subject is not eligible for the selected image selection.

6. The image processing device according to claim 1, further comprising:
    a first positivity editing portion configured to increase and decrease the positivity that the positivity computation portion computed for the selection-eligible image based on input from a user of the image processing device.

7. The image processing device according to claim 1, further comprising:
    a second positivity editing portion configured to increase and decrease the positivity that was computed for the selection candidate image for the imaged subject based on input from a user of the image processing device.

8. The image processing device according to claim 1, further comprising:
    an image acquisition portion configured to acquire and input n real time the at least one selection-eligible image.

9. The image processing device according to claim 1, further comprising:
a storage portion configured to store the at least one selection-eligible image.

10. The image processing device according to claim 1, wherein the at least one selection-eligible image is input from an external device.

11. An image processing method, comprising the steps of:
specifying a facial region of an imaged subject within at least one sequentially input selection-eligible image and extracting, with a processor, from a selection-eligible image in the at least one sequentially input selection-eligible image a facial image that corresponds to the facial region;
determining whether the imaged subject is eligible for image selection;
if it is determined that the imaged subject is eligible for image selection, computing for the selection-eligible image, using the facial image and information indicating at least one of a date and time of acquisition of the selection-eligible image and a location of the acquisition of the selection-eligible image, a positivity of the imaged subject toward a person who acquired the at least one selection-eligible image; and
comparing the selection-eligible image for which the positivity was computed in the computing step to a selection candidate image that has a greatest positivity among all the selection-eligible images for the imaged subject for which the positivities have been computed, and making the image with a greater positivity a new selection candidate image.

12. The image processing method according to claim 11, further comprising the step of:
selecting, as a selected image for the imaged subject, the selection candidate image for the imaged subject that is updated when the image with the greater positivity is made the new selection candidate image.

13. A memory device storing instructions that command a computer to execute a method comprising:
specifying a facial region of an imaged subject within at least one sequentially input selection-eligible image and extracts from a selection-eligible image in the at least one sequentially input selection-eligible image a facial image that corresponds to the facial region;
determining whether the imaged subject is eligible for image selection;
if it is determined that the imaged subject is eligible for image selection, computing for the selection-eligible image, using the facial image and information indicating at least one of a date and time of acquisition of the selection-eligible image and a location of the acquisition of the selection eligible image, a positivity of the imaged subject toward a person who acquired the at least one selection-eligible image; and
comparing the selection-eligible image for which the positivity was computed in the computing portion to a selection candidate image that has a greatest positivity among all the selection-eligible images for the imaged subject for which the positivities have already been computed, and makes a image with the greater positivity a new selection candidate image.

14. The memory device according to claim 13, wherein the method further comprises:
selecting, as a selected image for the imaged subject, the selection candidate image for the imaged subject that is updated when the image with the greater positivity is made the new selection candidate image.

15. The image processing apparatus of claim 1, wherein the facial image extraction portion is further configured to append index information to the extracted facial image, wherein the index information correlates the extracted facial image to the selection-eligible image from which the extracted facial image was extracted.

16. The image processing method of claim 11, wherein specifying the facial region further comprises appending index information to the extracted facial image, wherein the index information correlates the extracted facial image to the selection-eligible image from which the extracted facial image was extracted.

17. The memory device of claim 13, wherein specifying the facial region further comprises appending index information to the extracted facial image, wherein the index information correlates the extracted facial image to the selection-eligible image from which the extracted facial image was extracted.

* * * * *